United States Patent
Wan

(10) Patent No.: US 11,020,665 B2
(45) Date of Patent: Jun. 1, 2021

(54) INFORMATION PROCESSING METHOD AND APPARATUS, STORAGE MEDIUM, AND ELECTRONIC DEVICE FOR CUSTOM MODEL EDITING

(71) Applicant: NETEASE (HANGZHOU) NETWORK CO., LTD., Zhejiang (CN)

(72) Inventor: Changkun Wan, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/348,507

(22) PCT Filed: Sep. 29, 2018

(86) PCT No.: PCT/CN2018/108782
§ 371 (c)(1),
(2) Date: May 9, 2019

(87) PCT Pub. No.: WO2019/128358
PCT Pub. Date: Jul. 4, 2019

(65) Prior Publication Data
US 2020/0316476 A1    Oct. 8, 2020

(30) Foreign Application Priority Data
Dec. 29, 2017    (CN) .......................... 201711480347.0

(51) Int. Cl.
*A63F 13/63*    (2014.01)
*A63F 13/2145*    (2014.01)
(Continued)

(52) U.S. Cl.
CPC .......... *A63F 13/63* (2014.09); *A63F 13/2145* (2014.09); *G06F 3/04845* (2013.01);
(Continued)

(58) Field of Classification Search
CPC ................ A63F 13/2145; A63F 13/63; A63F 2300/308; G06F 3/04845; G06F 3/04883
See application file for complete search history.

(56) References Cited

U.S. PATENT DOCUMENTS

| 8,502,835 B1 | 8/2013 | Meehan |
| 2002/0069261 A1 | 6/2002 | Bellare et al. |

(Continued)

FOREIGN PATENT DOCUMENTS

| CN | 1945588 A | 4/2007 |
| CN | 104063210 A | 9/2014 |

(Continued)

OTHER PUBLICATIONS

Coding Cookie, "Minecraft How To: Save and load structures with the structure block", May 24, 2016, pp. 1-3, at https://www.youtube.com/watch?v=i8l1QpleKac, (last visited Dec. 23, 2020). (Year: 2016).*

(Continued)

*Primary Examiner* — Steve Rowland
(74) *Attorney, Agent, or Firm* — Gang Yu

(57) ABSTRACT

An information processing method and apparatus, a storage medium, and an electronic device is provided. The method includes: a custom model editing control in a graphical user interface is provided; in response to a first touch operation acting on the custom model editing control, a first virtual character is controlled to build a custom model building in at least one first building area in a first game scene; and in response to a trigger event indicating the end of custom model editing, the custom model building is saved as a custom model.

11 Claims, 4 Drawing Sheets

(51) Int. Cl.
  *G06F 3/0484* (2013.01)
  *G06F 3/0488* (2013.01)
(52) U.S. Cl.
  CPC .. *G06F 3/04883* (2013.01); *A63F 2300/1075* (2013.01); *A63F 2300/308* (2013.01)

(56) References Cited

U.S. PATENT DOCUMENTS

| | | | | |
|---|---|---|---|---|
| 2002/0097267 | A1* | 7/2002 | Dinan | H04L 29/06 715/757 |
| 2009/0197658 | A1* | 8/2009 | Polchin | A63F 13/02 463/9 |
| 2010/0164953 | A1* | 7/2010 | Wouhaybi | G06F 3/002 345/420 |
| 2010/0169799 | A1* | 7/2010 | Hyndman | A63F 13/79 715/757 |
| 2010/0184498 | A1 | 7/2010 | Takahashi et al. | |
| 2011/0190062 | A1* | 8/2011 | Lee | A63F 9/24 463/42 |
| 2013/0307875 | A1* | 11/2013 | Anderson | G06T 19/006 345/633 |
| 2014/0024464 | A1* | 1/2014 | Belakovsky | A63F 13/60 463/43 |

FOREIGN PATENT DOCUMENTS

| | | |
|---|---|---|
| CN | 104331587 A | 2/2015 |
| CN | 105935493 A | 9/2016 |
| CN | 107240155 A | 10/2017 |
| CN | 107308642 A | 11/2017 |
| CN | 108245894 A | 7/2018 |
| JP | 2015066141 A | 4/2015 |

OTHER PUBLICATIONS

Corresponding JP application search results.
MinceKuke, «Fortnite Battle Royale> Multiplayer free try> ;Sep. 28, 2017; https://www.bilibili.com/video/av14877586?from=search &seid=10109922513838037352.
MauritiusShadiaowang; <Seige besiege new player from zero part 1> https://www.bilibili.com/video/av8803208?from=search&seid= 6440265006001712729.
PlayStation Blog, Feb. 3, 2016 https://www.jp.palystation.com/blog/detail/2344/20160203-dqbuilders.html.
PS4 channel Pro; Oct. 1, 2017 https://www.ps4pro.jp/entry/2017/10/01/000000.
JP First Seacrh report dated Jan. 28, 2010.

* cited by examiner

INFORMATION PROCESSING METHOD AND APPARATUS, STORAGE MEDIUM, AND ELECTRONIC DEVICE FOR CUSTOM MODEL EDITING

TECHNICAL FIELD

The present disclosure relates to the technical field of games, and in particular to an information processing method and apparatus, a storage medium, and an electronic device.

BACKGROUND

Under the wave of the Internet, the continuous development and evolution of hardware and software technologies has promoted the emergence of smart devices and software. At the same time, a large number of mobile games with different themes emerged to meet the needs of users.

At least one mobile game application running on a mobile terminal currently has a variety of different themes and game play types, and the combination of a variety of different game play types to improve the playability of mobile games is currently the development direction of the game field. For example, a shoot type game and a building type game are combined, or a strategy type game and a parkour type game are combined.

For games, the diversity of game plays often determines whether a game can be successful. Therefore, more and more mobile games are more complex controlled to increase the playability of the games.

SUMMARY

In one embodiment of the present disclosure, an information processing method is provided. The method is applied to a mobile terminal having at least one processor for executing a software application and a touch screen which is rendered with a graphical user interface, contents rendered on the graphical user interface at least partially including a first game scene, the first game scene including at least one first virtual character, and the method may include the steps as follows.

A custom model editing control is provided on the graphical user interface.

In response to a first touch operation acting on the custom model editing control, the first virtual character is controlled to build a custom model building in at least one first building area in the first game scene.

In response to a trigger event indicating the end of custom model editing, the custom model building is saved as a custom model.

In another embodiment of the present disclosure, an information processing apparatus is also provided. The apparatus is applied to a mobile terminal having at least one processor for executing a software application and a touch screen which is rendered with a graphical user interface, contents rendered on the graphical user interface at least partially including a first game scene, the first game scene including at least one first virtual character, and the apparatus may include:

a provision component, configured to provide a custom model editing control on the graphical user interface;

a custom model setting component, configured to control, in response to a first touch operation acting on the custom model editing control, the first virtual character to build a custom model building in at least one first building area in the first game scene; and a saving component, configured to save, in response to a trigger event indicating the end of custom model editing, the custom model building as a custom model.

In another embodiment of the present disclosure, a computer-readable storage medium is also provided, on which a computer program is stored, and the computer program is executed by at least one processor to implement the above information processing method.

In another embodiment of the present disclosure, an electronic device is also provided. The electronic device includes:

at least one processor; and at least one memory, configured to store at least one executable instruction of the at least one processor, and the at least one processor is configured to execute the above information processing method by executing the at least one executable instruction.

DETAILED DESCRIPTION

Figure 1:
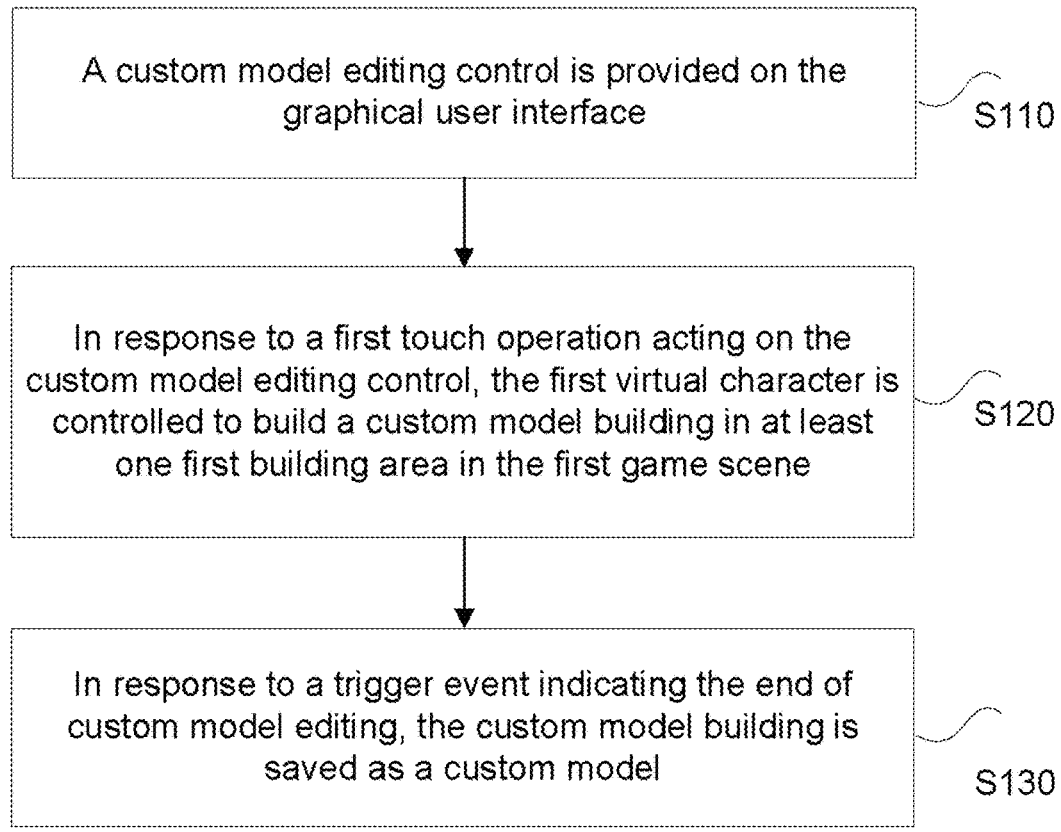
FIG. 1 is a flowchart of an information processing method according to an embodiment of the present disclosure.

It is to be noted that in the case of no conflict, the features in the embodiments and the embodiments in the present application may be combined with each other. The present invention is described below with reference to the drawings and in conjunction with the embodiments in detail.

In order to make those skilled in the art better understand the solutions of the present invention, the technical solutions in the embodiments of the present invention will be clearly and completely described below with reference to the drawings in the embodiments of the present invention. It is apparent that the described embodiments are a part of the embodiments of the present invention, not all of the embodiments. On the basis of the embodiments of the present invention, all other embodiments obtained on the premise of no creative work of those of ordinary skill in the art should fall within the scope of protection of the present invention.

It is to be noted that the specification and claims of the present disclosure and the terms "first", "second" and the like in the drawings are used to distinguish similar objects, and do not need to describe a specific sequence or a precedence order. It will be appreciated that data used in such a way may be exchanged under appropriate conditions, in order that the embodiments of the present invention described here can be implemented. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

It is also to be noted that various triggering events disclosed in the present disclosure may be preset, and different triggering events may trigger to execute different functions.

However, for a mobile terminal running a mobile game, a user usually manipulates the mobile game by thumbs of both hands. Under the restriction of hardware conditions, such as a smaller terminal display, less manipulation dimensions and lower computing power of a processor, a manipulation smoothness of the mobile game cannot achieve a manipulation smoothness of a Personal Computer (PC)-side game. For example, for a building game play in a game, usually, a PC-side user builds various components of a building to constitute this building step by step. However, under the restriction of hardware conditions of a mobile terminal, the manipulation of the user in a game scene through the mobile terminal during building is very cumbersome, the manipulation smoothness is poor, and it takes a lot of time for the user to repeatedly build various components of the building. For a game with strong real-time performance, a war situation is fast-changing and fleeting, and a lot of time is spent on repetitive building, thereby often resulting in a poor user experience.

One of the embodiments of the present disclosure provides an information processing method, and an execution body of the method may be any terminal device such as a mobile phone, a PDA, a tablet computer, a handheld game terminal, or an electronic device. The method is applied to a mobile terminal having at least one processor for executing a software application and a touch screen which is rendered with a graphical user interface, contents rendered on the graphical user interface at least partially including a first game scene, the first game scene including at least one first virtual character. FIG. 1 is a flowchart of an information processing method according to an embodiment of the present invention. As shown in FIG. 1, in the present embodiment, the method includes the steps as follows.

At step S110, a custom model editing control is provided on the graphical user interface.

At step S120, in response to a first touch operation acting on the custom model editing control, the first virtual character is controlled to build a custom model building in at least one first building area in the first game scene.

At step S130, in response to a trigger event indicating the end of custom model editing, the custom model building is saved as a custom model.

By means of the information processing method provided in this embodiment, a building desired to be built in a game by a user is customized and packaged in advance, so that the user can quickly build a custom building in a game, thereby realizing the personalized customization of the user for the building, avoiding wasting too much time in repetitive component building in the game, effectively improving the user experience, reducing the manipulation complexity of the user during building through a mobile terminal, and enhancing the smoothness of game manipulation.

Each step of the information processing method in the present embodiment will be further described below.

In the present exemplary embodiment, the method is applied to the mobile terminal having the at least one processor for executing the software application and the touch screen which is rendered with the graphical user interface, the contents rendered on the graphical user interface at least partially including the first game scene, the first game scene including at least one first virtual character.

It is to be noted that there may be at least one game scene with different uses according to actual conditions, such as the first game scene and a second game scene. The first game scene and the second game scene may adopt the same scene layout or different scene layouts. The first game scene and the second game scene may be independent of each other, or the first game scene and the second game scene may reuse the same game scene to achieve different functions. For example, the first game scene is used for editing a building by the first virtual character, and the second game scene is used for building a building by the first virtual character and attacking other virtual characters.

The contents rendered on the graphical user interface may include the entire part of the game scene, and may also be part of the game scene. For example, when a game scene is relatively large, local content of the game scene is rendered on a graphical user interface of a mobile terminal during the game. The game scene may be a square shape or other shapes (e.g., circles, etc.). The game scene may include ground, mountains, rocks, flowers, grass, trees, buildings, and the like.

The game scene includes at least one first virtual character and may be rendered on the graphical user interface. The contents rendered on the graphical user interface may include the entire part of each virtual character or the local part of each virtual character. For example, in a third person perspective game, the contents rendered on the graphical user interface may include the entire part of each virtual character. For another example, in a first person perspective game, the contents rendered on the graphical user interface may include part of each virtual character. The first virtual character may be a game virtual character manipulated by a mobile terminal.

In an alternative embodiment, the graphical user interface includes a mini-map. The mini-map may be a thumbnail of the entire game scene, or may be a thumbnail of a local part of the game scene. Different details may be rendered in the mini-map for different types of games (e.g., details of maps that may be used for assisting each player in determining a location of a virtual character controlled by this player in the game world, real-time locations of ally virtual characters controlled by teammates, real-time locations of enemy virtual characters, current vision information of the game scene, etc.). The mini-map may be rendered at the upper left, upper right, or other locations on the graphical user interface. The present exemplary embodiment is not limited thereto.

In an alternative implementation manner, in step S110, the custom model editing control is provided on the graphical user interface.

In an alternative implementation manner, the custom model editing control may be preset to be provided at any location of the graphical user interface, or may be provided at a specific location according to the at least one touch operation of the user, or may also be provided at a suitable location automatically selected according to the layout of the current graphical user interface. The present embodiment is not particularly limited.

In an alternative implementation manner, the custom model editing control is a visible area on the graphical user interface, such as a touch control having a bounding box, or a color-filled touch control, or a touch control having a predetermined transparency. The visible area can quickly make a user position the touch control, and an operation difficulty of a game novice can be reduced.

In an alternative implementation manner, the custom model editing control is an invisible area on the graphical user interface. The invisible area cannot cover or affect a game screen, can provide a better screen effect, can save a screen space, and is applicable to operations of a game master.

In an alternative implementation manner, in step S120, in response to the first touch operation acting on the custom model editing control, the first virtual character is controlled to build the custom model building in the first building area in the first game scene.

In response to the first touch operation acting on the custom model editing control, the first virtual character is controlled to build the custom model building in the first building area in the first game scene. The first touch operation may be a touch operation, or a click operation performed by a touch medium. The first building area in the first game scene may be a preset specific area, or may be a specific area provided after satisfying a preset condition.

Alternatively, the first game scene is specifically used for editing the custom model, and may specifically provide a brand new scene as the first game scene, or may intercept a small part or all of the game scene (namely second game scene) as the first game scene. And there is no game character manipulated by other mobile terminals in the first game scene, and the first virtual character may be freely moved and built according to the control in the first game scene.

In an alternative implementation manner, the custom model building is formed by splicing at least one building component.

The custom model building may be formed by splicing at least one building component. It can be understood that the custom model corresponding to the custom model building may also be formed by splicing at least one component model corresponding to the at least one building component. The component model may be in the form of a horizontal plate, a vertical wall, an upward ladder, a downward slope, etc., and the present embodiment is not particularly limited. The first virtual character is controlled to build each building component in the first building area in the first game scene, so as to splice a final custom model building.

In an alternative implementation manner, spaces of the first game scene and the second game scene are divided into multiple mutually spliced geometries. Each of the multiple mutually spliced geometries may be a rectangular parallelepiped, a cube, a parallelepiped, a honeycomb, etc. It can be understood that the geometries may be spliced together to form a space for the entire game scene. It is to be noted that each geometry formed by dividing the space of the game scene is a logic area, such as a spatial area in which x, y, and z coordinates are in a range of 0 to 50.

Alternatively, each of the multiple mutually spliced geometries is a rectangular parallelepiped with the same length and width. A coordinate system XYZ is established in the space of the game scene. XZ are horizontal coordinates and Y is a vertical upward coordinate. The way of spatial division refers to dividing the space into an infinite number of rectangular parallelepipeds with intervals of X=5 m, Z=5 m and vertical upward Y=3.5 m. It is to be noted that the length, width and height of the rectangular parallelepiped may be set by a developer arbitrarily according to the actual situation.

Through the above implementation manners, on the one hand, the building built by the first virtual character and the original building in the game scene can be aligned and spliced; and on the other hand, physical collision detection between the buildings during building in the game scene is avoided, so that the system overhead can be effectively reduced, and the smooth running of the game can be improved.

The following describes an example in which a space is divided into multiple mutually spliced rectangular parallelepipeds with the same length and width. It is to be noted that multiple spliced geometries that divide the space into any shape are included in the protection scope of the present disclosure.

In an alternative implementation manner, at step S120, controlling the first virtual character to build the custom model building in the first building area in the first game scene may further include the steps as follows.

At step S1201, a first geometry where the first virtual character is located in the first game scene is determined according to a current location of the first virtual character.

At step S1202, a surface of the first geometry, or a surface of a second geometry adjacent to the first geometry, or a section in the first geometry, or a section in the second geometry is determined as the first building area according to a current orientation of the first virtual character.

At step S1203, the custom model building is built in the first building area in the first game scene.

It is to be noted that in a first game scene space divided into multiple mutually spliced geometries having the same length and width, the surface of each geometry and the section in each geometry may be used as the first building area, and moreover, the components of the original building in the first game scene are also pre-built according to the surface of each geometry and the section in each geometry.

Alternatively, since the space of the first game scene is divided into multiple mutually spliced geometries having the same length and width, a geometry where the first virtual character is located may be determined according to the current location of the first virtual character, and the geometry is determined to be the first geometry.

Centering on the first geometry, multiple second geometries adjacent to the first geometry are determined. And the expression that the first geometry adjacent to the second geometry refers to that: the first geometry and the second geometry share a surface, or the first geometry and the second geometry share a side.

One of the surfaces or an internal section is selected from the first geometry or the second geometry according to the current orientation of the first virtual character to be determined as the first building area. In an alternative implementation manner, a surface or an internal section of the first geometry, or a surface or an internal section of the second geometry appearing in front of the current orientation of the first virtual character is determined as the first building area. In an alternative implementation manner, a surface or an internal section of the first geometry, or a surface or an internal section of the second geometry is determined as the first building area according to a type of the building model. For example, if the building model is a vertical wall, a vertical surface of the first geometry or the second geometry is determined as the first building area. And if the building model is an obliquely upward ladder, an inclined section of the first geometry or the second geometry is determined as the first building area.

Through the above implementation manners, by geometrically normalizing the game scenes, the built building and the original building in each game scene can be aligned and spliced, and the aesthetic feeling of the game screen is enhanced; and moreover, physical collision detection between the buildings during building in the game scene is avoided, so that the system overhead can be effectively reduced, and the smooth running of the game can be improved.

In an alternative implementation manner, at step S120, controlling the first virtual character to build the custom model building in the first building area in the first game scene may further include the steps as follows.

At step S1204, first location information and first orientation information of the first virtual character in the first game scene are acquired.

At step S1205, the at least one first building area is determined according to the first location information and the first orientation information.

At step S1206, the at least one building component is built in the at least one first building area.

At step S1207, the at least one building component is numbered according to a building sequence for building the at least one building component.

The moving direction of the first virtual character may be changed in the first game scene according to the at least one touch operation of the user, thereby performing free movement to cause the location change of the first virtual character in the first game scene. The orientation of the first virtual character may also be changed in the first game scene according to the at least one touch operation of the user in the first game scene.

In an alternative implementation manner, a moving controller is provided on the graphical user interface, and the first virtual character is configured to move in the first game scene according to at least one touch operation acting on the moving controller. The moving controller may be a virtual joystick, a direction control virtual key or the like, and the present exemplary embodiment does not specially define this.

Specifically, in response to the at least one touch operation acting on the moving controller, the first virtual character is controlled to move in the first game scene according to a movement of a touch point of the at least one touch operation.

In an alternative implementation manner, the moving controller is a virtual joystick, and the first virtual character is controlled to move in the first game scene according to the at least one touch operation acting on the virtual joystick.

In an alternative implementation manner, the moving controller is a virtual cross key/virtual direction key (D-PAD), and the first virtual character is controlled to move in the first game scene according to the at least one touch operation acting on the virtual cross key.

In an alternative implementation manner, an orientation control area is provided on the graphical user interface, and an orientation of the first virtual character is adjusted in the first game scene according to at least one touch operation acting on the orientation control area.

Specifically, in response to the at least one touch operation acting on the orientation control area, the orientation of the first virtual character in the first game scene is adjusted according to the movement of a touch point of the at least one touch operation.

In an alternative implementation manner, the orientation control area may be, for example, a virtual joystick area, a direction control virtual key or other different modes.

In an alternative implementation manner, the orientation control area is a virtual joystick area, and the first virtual character is controlled to adjust the orientation in the first game scene according to the at least one touch operation acting on the virtual joystick area.

In an alternative implementation manner, the orientation control area is a virtual cross key/virtual direction key (D-PAD) area, and the first virtual character is controlled to adjust the orientation in the first game scene according to the at least one touch operation acting on the virtual cross key area.

Adjusting the orientation of the first virtual character in the first game scene refers to adjusting a current orientation of the first virtual character in the first game scene. It is to be noted that the orientation of the first virtual character in the first game scene is different from the moving direction of the first virtual character in the first game scene. The orientation and moving direction of the first virtual character in the first game scene are independent of each other and may be superimposed on each other. For example, an orientation of a first virtual character A in the first game scene is controlled to be north, and meanwhile, the first virtual character A is controlled to move at a preset speed V1 and move in the west direction, thereby realizing a performance effect of the first virtual character A in the first game scene as follows. The first virtual character A takes the north direction as the current orientation, and the location change occurs in the first game scene with the preset speed V1 as the moving speed and the west direction as the moving direction.

An orientation control area is provided on the graphical user interface, in response to at least one touch operation acting on the orientation control area, an orientation of the first virtual character in the first game scene is adjusted according to the movement of a touch point of the at least one touch operation.

In an alternative implementation manner, the building component is numbered according to a sequence for building the building component. Alternatively, when each of the building components is built, each building component is provided with a sequence number in chronological order, which can be visually fed back. For example, the sequence number is rendered on or next to the building component. The sequence number also may not be visually fed back. The sequence number may reflect the building sequence of custom buildings and is used for the logic during the generation of the custom building models. When the user builds the custom buildings in the second game scene, the custom buildings are built in sequence according to the building sequence.

In an alternative implementation manner, multiple sequence numbers that represent the building sequence of the building components are consecutive positive integers. For example, if there is a removed building component in the middle, the building components are renumbered in the previous building sequence.

At least one first building area is determined according to the first location information and the first orientation information, and at least one building component is built in the at least one first building area respectively, thereby splicing to form at least one custom model building. The at least one building component is numbered according to a building sequence of the at least one building component.

Through the above implementation manner, on the one hand, the current location and the current orientation of the first virtual character in the first game scene is controlled, thereby adjusting the location of the at least one first building area, and without increasing the number of controls on the graphical user interface, the user is allowed to quickly select and modify each area to be built in the game to improve the manipulation smoothness of the game; and on the other hand, the building components are numbered according to the building sequence, so that the system can record various components of the custom model building, it is also convenient for the user to quickly identify various components of the custom model building, and the user can quickly modify and adjust the custom model.

Figure 2:
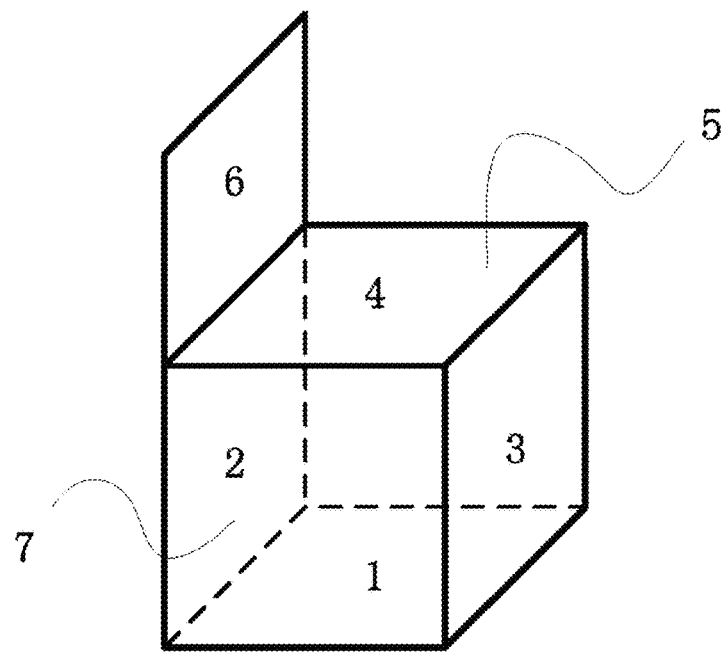
FIG. 2 is a schematic diagram of sequentially numbering custom buildings according to an exemplary embodiment of the present disclosure.

FIG. 2 is a schematic diagram of sequentially numbering custom buildings according to an exemplary embodiment of the present disclosure. As shown in FIG. 2, the custom building is formed by splicing seven components, which are: a horizontal plate numbered 1 on a bottom surface of a geometry, a vertical wall numbered 2 on a left vertical surface of the geometry, a vertical wall numbered 3 on a right vertical surface of the geometry, a horizontal plate numbered 4 on a top surface of the geometry, a vertical wall numbered 5 on a rear vertical surface of the geometry, a vertical wall numbered 6 on an upper vertical surface of the geometry, and a vertical wall numbered 7 on a front vertical surface of the geometry. One first building areas is determined according to the first location information and the first orientation information, a horizontal plate style building component is built in this one first building areas, and the building component is sequentially numbered 1. Then another first building area is determined according to the adjustment of the first location information and the first orientation information, a vertical wall style building component is built in the other first building area, and the building component is sequentially numbered 2. The above steps are repeated to still build the seven building components shown in FIG. 2.

Through the above implementation manner, the building components are numbered according to the building sequence, so that the system can record various components of the custom model building, it is also convenient for the user to quickly identify various components of the custom model building, and the user can quickly modify and adjust the custom model.

In an alternative implementation manner, at step S130, in response to the trigger event indicating the end of custom model editing, the custom model building is saved as the custom model.

The trigger event may be triggered by detecting at least one touch operation of a specific trigger control provided on the graphical user interface, or may be triggered according to a preset interaction condition, such as user pressing, shaking, voice input, or special gesture operation. The custom model building is saved as the custom model, that is, each building built in the first game scene is saved as the corresponding custom model.

In an alternative implementation manner, at step S130, the method further includes the steps as follows.

At step S1301, a saving control is provided on the graphical user interface.

At step S1302, in response to a second touch operation acting on the saving control, a building currently existing in the first game scene is determined as the custom model building.

At step S1303, the custom model building is saved as the custom model.

In an alternative implementation manner, the saving control may be preset to be provided at any location of the graphical user interface, or may be provided at a specific location according to the at least one touch operation of the user, and may also be provided at a suitable location automatically selected according to the layout of the current graphical user interface. The present embodiment is not particularly limited.

In an alternative implementation manner, the second touch operation may be a clicking operation. In response to the clicking operation of the user on the saving control, the building existing in the current first game scene is determined as a custom model building, and the custom model building is saved as a custom model, which can be used for implementing one-button building of the custom model building corresponding to the custom model in the second game scene.

In an alternative implementation manner, at step S130, saving the custom model building as the custom model further includes the steps as follows.

At step S1304, it is determined whether a maximum number of the at least one building component is greater than or equal to 1.

At step S1305, when the maximum number of the at least one building component is greater than or equal to 1, the custom model building is saved as the custom model, and the building sequence of the at least one building component in the custom model is determined and recorded according to the number result.

At step S1306, when the maximum number of the at least one building component is less than 1, a saving failure is prompted.

In an alternative implementation manner, when saving the custom model building as the custom model, a maximum number of at least one building component in the first game scene is acquired. And it is determined whether the maximum number is greater than or equal to 1. If the maximum number is greater than or equal to 1, it indicates that there is at least one building component in the first game scene, at least one building component existing in the first game scene is spliced into a custom model, the custom model is saved, and a building sequence of the custom model is determined and recorded according to the number result. Or, each of at least one building component existing in the first game scene is saved as a corresponding component model, at least one corresponding component model is spliced into a custom model, the custom model is saved, and a building sequence of the custom model is determined and recorded according to the number result. Or, at least one building component existing in the first game scene is sequentially saved as each component model in a custom model according to the number result, and a building sequence of the custom model is recorded. The present implementation manner is not particularly limited.

In an alternative implementation manner, if the maximum number is less than 1, it indicates that there is no building component in the first game scene, that is, no building component is built in the first game scene. At this time, a saving failure is prompted, and feedback may be made on the graphical user interface. For example, an alarm tone, or a graphic or text prompt "Your building plan is too empty and cannot be saved" is issued.

Through the above implementation manner, it is possible to determine whether the user has performed the setting of the custom model according to the number result, the pattern detection of the system is avoided, and the system overhead can be effectively reduced.

In an alternative implementation manner, as shown in FIG. 2, in response to a custom model editing end triggering event, the maximum number of the at least one building component in the first game scene is acquired, such as a vertical wall on a front vertical surface of a geometry in FIG. 2, the sequence number of the vertical wall is 7. Since 7 is greater than 1, a custom model building (formed by splicing building components numbered 1-7) existing in the first game scene is saved as a custom model, and a building sequence of the custom model is recorded. That is, a building sequence 1: a horizontal plate numbered 1 on a bottom surface of the geometry; a building sequence 2: a vertical wall numbered 2 on a left vertical surface of the geometry; a building sequence 3: a vertical wall numbered 3 on a right vertical surface of the geometry; a building sequence 4: a horizontal plate numbered 4 on a top surface of the geometry; a building sequence 5: a vertical wall numbered 5 on a rear vertical surface of the geometry; a building sequence 6: a vertical wall numbered 6 on an upper vertical surface of the geometry; and a building sequence 7: a vertical wall numbered 7 on a front vertical surface of the geometry.

Through the above implementation manner, it is possible to determine whether the user has performed the setting of the custom model according to the number result, the pattern detection of the system is avoided, and the system overhead can be effectively reduced. Moreover, the building components are numbered according to the building sequence, so that the system can record various components of the custom model building, it is also convenient for the user to quickly identify various components of the custom model building, and the user can quickly modify and adjust the custom model.

In an alternative implementation manner, at step S130, saving the custom model building as the custom model further includes the steps as follows.

At step S1307, second location information and second orientation information of the first virtual character in the first game scene are acquired.

At step S1308, third location information and third orientation information of the custom model building relative to the first virtual character are determined according to the second location information and the second orientation information.

At step S1309, the custom model building is saved as the custom model, and the third location information and the third orientation information are recorded.

In an alternative implementation manner, the second location information and the second orientation information of the first virtual character are first acquired, and the second location information may be characterized by a certain coordinate in a spatial coordinate system of the first game scene, such as, (10, 20, 5). The second orientation information may be characterized by an offset of the second orientation of the first virtual character relative to a direction in the first game scene, for example, 10° north by east. In addition, the second location information and the second orientation information of the first virtual character may also be characterized by a certain vector in a spatial coordinate system of the first game scene. It can be understood that the second location information and the second orientation information may also be characterized by other forms in the case of being recognized by a processor, and the present implementation manner is not particularly limited.

In an alternative implementation manner, the third location information and the third orientation information refer to a location information and an orientation information of the custom model building as a whole relative to the first virtual character, or refer to the a location information and an orientation information of each of the building components of the custom model building relative to the first virtual character.

In an alternative implementation manner, according to the second location information and the second orientation information, third location information and third orientation information of the custom model building relative to the first virtual character are determined. The third location information may be characterized by a certain coordinate in a spatial coordinate system of the first game scene, such as, (20, 10, 10). Or, by using a current location of the first virtual character as an origin of the coordinate system, the third location information of the custom model building or each building component relative to the first virtual character is characterized by coordinates, such as (10, −10, 5). The second orientation information may be characterized by an offset of the second orientation of the custom model building or each building component relative to a direction in the first game scene, such as, 10° north by west. Or, by using the second orientation of the first virtual character as a true north direction, the third orientation information is characterized by an offset of the current orientation of the custom model building or each building component relative to the second orientation of the first virtual character, such as, 20° north by west. In addition, the third location information and the third orientation information may also be characterized by a certain vector in a spatial coordinate system of the first game scene by calculation according to the vector characterized by the second location information and the second orientation information of the first virtual character. It can be understood that the third location information and the third orientation information may also be characterized by other forms in the case of being recognized by a processor, and the present implementation manner is not particularly limited.

Through the above implementation manner, the third location information of the custom model building and the first virtual character is recorded, so that a building area is quickly determined according to the third location information in the game, and the consistency of the custom model building built in the second game scene and the third location of the first virtual character can be maintained, thereby reducing the system performance consumption, and enhancing the user experience.

In an alternative implementation manner, the contents rendered on the graphical user interface at least further partially include a second game scene. The second game scene is an actual game scene, in which there are game characters manipulated by other mobile terminals. In the second game scene, the first virtual character may be freely moved and built according to control, and may also attack other virtual characters or interact with other virtual characters.

In an alternative implementation manner, the method further includes the steps as follows.

At step S140, a custom model building control corresponding to the custom model is provided on the graphical user interface.

At step S150, in response to a third touch operation acting on the custom model building control, the custom model is acquired.

At step S160, a custom model building corresponding to the custom model is built in the second game scene.

In an alternative implementation manner, the custom model building control may be preset to be provided at any location of the graphical user interface, or may be provided at a specific location according to the at least one touch operation of the user, and may also be provided at a suitable location automatically selected according to the layout of the current graphical user interface. The present embodiment is not particularly limited.

In an alternative implementation manner, in response to the second touch operation acting on the custom model building control, the custom model is acquired. The second touch operation may be a touching operation, or a clicking operation performed by a touch medium.

In an alternative implementation manner, a moving controller is provided on the graphical user interface, and the first virtual character is configured to move in the second game scene according to at least one touch operation acting on the moving controller. The moving controller may be a virtual joystick, a direction control virtual key or the like, and the present exemplary embodiment does not specially define this.

Specifically, in response to the at least one touch operation acting on the moving controller, the first virtual character is controlled to move in the second game scene according to the movement of a touch point of the at least one touch operation.

In an alternative implementation manner, the moving controller is a virtual joystick, and the first virtual character is controlled to move in the second game scene according to the at least one touch operation acting on the virtual joystick.

In an alternative implementation manner, the moving controller is a virtual cross key/virtual direction key (D-PAD), and the first virtual character is controlled to move in the second game scene according to the at least one touch operation acting on the virtual cross key.

In an alternative implementation manner, an orientation control area is provided on the graphical user interface, and the first virtual character is configured to adjust an orientation in the second game scene according to at least one touch operation acting on the orientation control area.

Specifically, in response to at least one touch operation acting on the orientation control area, an orientation of the first virtual character in the second game scene is adjusted according to the movement of a touch point of the at least one touch operation.

In an alternative implementation manner, the orientation control area may be, for example, a virtual joystick area, a direction control virtual key or other different modes.

In an alternative implementation manner, the orientation control area is a virtual joystick area, and the first virtual character is controlled to adjust an orientation in the second game scene according to the at least one touch operation acting on the virtual joystick area.

In an alternative implementation manner, the orientation control area is a virtual cross key/virtual direction key (D-PAD) area, and the first virtual character is controlled to adjust an orientation in the second game scene according to the at least one touch operation acting on the virtual cross key area.

Adjusting the orientation of the first virtual character in the second game scene refers to adjusting the current orientation of the first virtual character in the second game scene. It is to be noted that the orientation of the first virtual character in the second game scene is different from the moving direction of the first virtual character in the second game scene. The orientation and moving direction of the first virtual character in the second game scene are independent of each other and can be superimposed on each other. For example, an orientation of a first virtual character A in the second game scene is controlled to be north, and meanwhile, the first virtual character A is controlled to move at a preset speed V1 and move in the west direction, thereby realizing the performance effect of the first virtual character A in the second game scene as follows. The first virtual character A takes the north direction as the current orientation, and the location change occurs in the second game scene with the preset speed V1 as the moving speed and the west direction as the moving direction.

An orientation control area is provided on the graphical user interface, in response to at least one touch operation acting on the orientation control area, an orientation of the first virtual character in the second game scene is adjusted according to the movement of a touch point of the at least one touch operation.

In an alternative implementation manner, a second building area is determined according to the location and orientation of the first virtual character in the second game scene, and a custom model building corresponding to the custom model is built in the second building area.

Through the above implementation manner, each custom model corresponding to the custom model building built in the first game scene is packaged, and building of the custom model is trigged by detecting at least one touch operation of a control, so that the user can quickly select and complete the building of a custom building, thereby effectively improving the convenience of manipulation.

In an alternative implementation manner, at step S160, building the custom model building corresponding to the custom model in the second game scene further includes the steps as follows.

At step S1601, the third location information and the third orientation information are acquired, and fourth location information and fourth orientation information of the first virtual character in the second game scene are acquired.

At step S1602, at least one second building area is determined in the second game scene according to the third location information, the third orientation information, the fourth location information and the fourth orientation information.

At step S1603, a custom model building corresponding to the custom model is built in the at least one second building area according to the building sequence.

In an alternative implementation manner, the at least one custom model and the third location information and the third orientation information, and the fourth location information and the fourth orientation information of the first virtual character in the second game scene are also acquired. A second building area is determined according to the fourth location information, the fourth orientation information, the third location information, and the third orientation information. And when the third location information and the third orientation information are the location information and orientation information of the custom model building relative to the first virtual character as a whole, the second building area is determined in the second game scene, and the second building area is used for building the entire custom model building. When the third location information and the third orientation information are the location information and the orientation information of each building component of the custom model building relative to the first virtual character, a plurality of second building areas are determined in the second game scene. And the number of the plurality of second building areas corresponds to the number of the building components, and the plurality of second building areas are used for building the building component of each custom model building.

Through the above implementation manner, at least one second building area may be quickly determined in the second game scene according to the third location information, the third orientation information, the fourth location information and the fourth orientation information, so that the convenience of user manipulation can be effectively improved; and the consistency of the custom model building built in the second game scene and a relative location of the first virtual character can be maintained, thereby reducing the system performance consumption, and enhancing the user experience.

Figure 3:
FIG. 3 is a schematic diagram of a graphical user interface according to an exemplary embodiment of the present disclosure.

In an alternative implementation manner, when the user completes the building of a custom building, as shown in FIG. 2, and the custom building is saved as a corresponding custom model. FIG. 3 is a schematic diagram of a graphical user interface according to an exemplary embodiment of the present disclosure. As shown in FIG. 3, a custom model building control (an icon in a right box of the interface) corresponding to the custom model is provided on the graphical user interface. And in response to a clicking operation acting on the custom model building control, a corresponding custom model, third location information, third orientation information, fourth location information and fourth orientation information of the first virtual character in the second game scene are acquired.

For example, when the custom building is saved as a corresponding custom model, the third location information of the custom building is: a horizontal spacing from the vertical wall numbered 7 on the front vertical surface of the geometry to the first virtual character is 10 m, and a vertical spacing to the first virtual character is 0. And the third orientation information of the custom building is: the vertical wall numbered 7 on the front vertical surface of the geometry is directly in front of the first virtual character. A second building area is determined in the second game scene according to the above information, that is, a place 10 m directly in front of the first virtual character is determined as the second building area.

For another example, when the custom building is saved as a corresponding custom model, the third location information of the custom building is: a horizontal spacing from the horizontal plate numbered 4 on the top surface of the geometry to the first virtual character is 0, a vertical spacing to the first virtual character is 0. That is, the first virtual character is above the horizontal plate numbered 4. And the third orientation information of the custom building is: the horizontal plate numbered 4 on the top surface of the geometry is right below the first virtual character. A second building area is determined in the second game scene according to the above information. That is, an area, where the foot of the first virtual character is located, is determined as the second building area. It is to be noted that after a building is built in the area, where the foot of the first virtual character is located, the first virtual character is automatically lifted up, so that the first virtual character is above the building.

The custom model building corresponding to the custom model is built in the second building area according to the building sequence. And the building sequence is as follows: a building sequence 1: a horizontal plate numbered 1 on a bottom surface of the geometry; a building sequence 2: a vertical wall numbered 2 on a left vertical surface of the geometry; a building sequence 3: a vertical wall numbered 3 on a right vertical surface of the geometry; a building sequence 4: a horizontal plate numbered 4 on a top surface of the geometry; a building sequence 5: a vertical wall numbered 5 on a rear vertical surface of the geometry; a building sequence 6: a vertical wall numbered 6 on an upper vertical surface of the geometry; and a building sequence 7: a vertical wall numbered 7 on a front vertical surface of the geometry.

Through the above implementation manner, the second building area may be quickly determined according to the fourth location information and the fourth orientation information of the first virtual character and the third location information of the custom model building and the first virtual character, so that the convenience of user manipulation can be effectively improved; and the consistency of the custom model building built in the second game scene and a relative location of the first virtual character can be maintained, thereby reducing the system performance consumption, and enhancing the user experience.

In an alternative implementation manner, the method further includes the steps as follows.

At step S170, a priority setting control is provided on the graphical user interface. At step S180, in response to a fourth touch operation acting on the priority setting control, a priority of at least one material used for building the custom model building is set according to the fourth touch operation, the at least one material including at least one of the following: wood, stone, and iron.

In an alternative implementation manner, the priority setting control may be preset to be provided at any location of the graphical user interface, or may be provided at a specific location according to the at least one touch operation of the user, and may also be provided at a suitable location automatically selected according to the layout of the current graphical user interface. The present embodiment is not particularly limited.

In an alternative implementation manner, in response to the fourth touch operation acting on the priority setting control, the priority of the at least one material used for building the custom model building is set according to the fourth touch operation. The fourth touch operation may be a touching operation, or a clicking operation performed by a touch medium.

In an alternative implementation manner, a building of a custom model building in a game scene requires the use of at least one particular material, the type of which may be preset by the developer as needed. For example, the at least one material includes at least one of the following: wood, stone, and iron.

Figure 4:
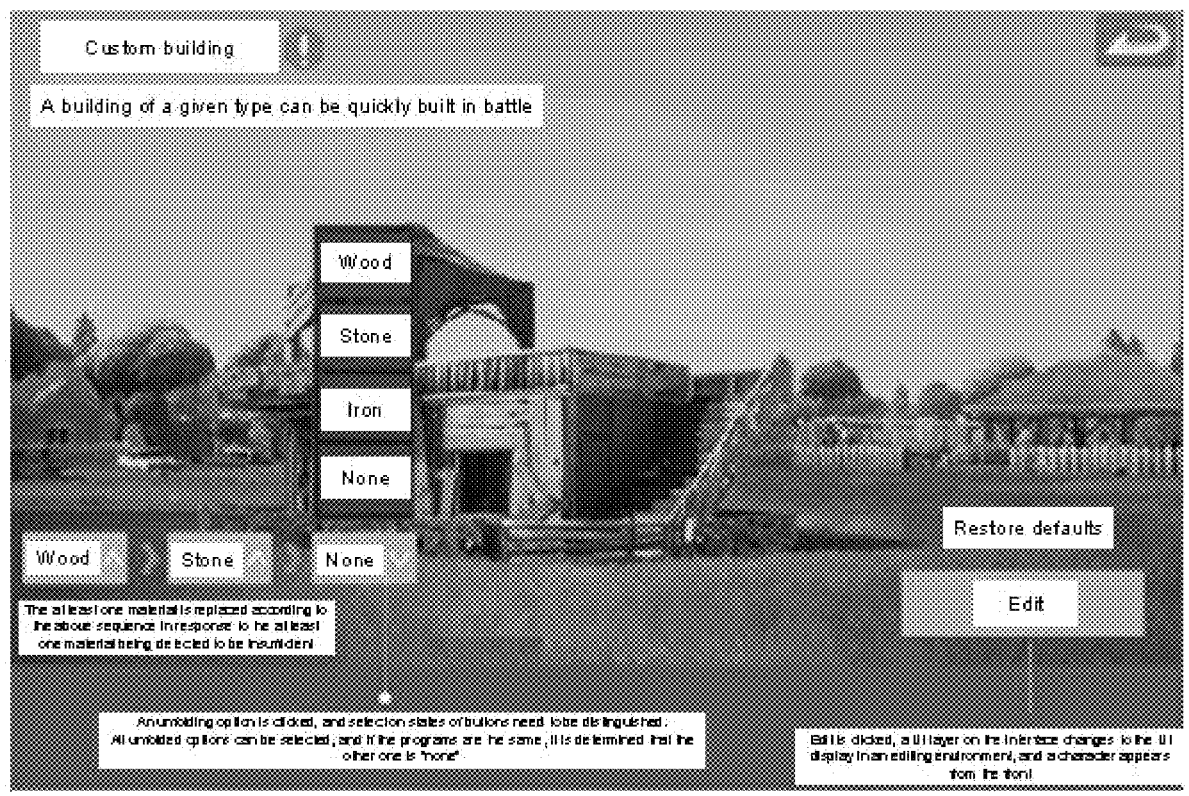
FIG. 4 is a schematic diagram of a graphical user interface according to another exemplary embodiment of the present disclosure.

In an alternative implementation manner, FIG. 4 is a schematic diagram of a graphical user interface in one of the exemplary embodiments of the present disclosure. As shown in FIG. 4, an editing icon in the lower right corner of the graphical user interface is a custom model editing control. The "wood>stone>none" selectable control in the lower left corner of the graphical user interface is the priority setting control. On the graphical user interface, the priority setting control can be operated by a clicking operation (namely the fourth touch operation). And the priority setting is divided into three levels, and the at least one material of each level may be selected by the user. As shown in FIG. 4, the priority is set to: first priority-wood, second priority-stone, and third priority-no. After setting the priority of the at least one material used for the custom model building, when the user builds the custom model building in the second game scene, the building is completed by using the corresponding material according to the priority.

Through the above implementation manner, different priorities are set for the at least one materials used for the building, so that the user can further personalize the custom model. The playability of the game is enhanced, and the user experience is effectively improved.

In an alternative implementation manner, at step S1603, building the custom model building corresponding to the custom model in the second game scene according to the building sequence further includes the steps as follows.

At step S1603_1, a material with a first priority is determined according to the priority of the at least one material, and at least one building component corresponding to the custom model is sequentially built in the at least one second building area by using the material with the first priority according to the building sequence.

At step S1603_2, in response to the at least one material with the first priority being detected to be insufficient, it continues to build the building component corresponding to the custom model by using a material with a second priority according to the building sequence.

In an alternative implementation manner, in response to materials with all the priority being detected to be insufficient, the building of the custom model building is automatically terminated, and feedback can be provided on the graphical user interface. For example, an alarm tone, or a graphic or text prompt "Insufficient material, stop building" is issued.

Through the above implementation manner, by setting the priority of multiple materials, when any material is insufficient, automatic replacement of materials is realized at the time of building, so that the user does not need to manually switch materials, and the smoothness of manipulation is enhanced.

In an alternative implementation manner, after setting the priority of the at least one material used for the custom model building, as shown in FIG. 4, the priority is set to: first priority-wood, second priority-stone, and third priority-none. In the second game scene, a custom model building corresponding to the custom model shown in FIG. 2 is built, and it is assumed that the first virtual character currently has 40 units of wood, 20 units of stone, and 20 units of iron, and it takes 10 units of material to build a building component. The wood in a first priority sequence is sequentially built according to a building sequence: a horizontal plate numbered 1 on a bottom surface of a geometry, a vertical wall numbered 2 on a left vertical surface of the geometry, a vertical wall numbered 3 on a right vertical surface of the geometry, and a horizontal plate numbered 4 on a top surface of the geometry. When building a vertical wall numbered 5 on a rear vertical surface of the geometry, in response to the wood in the first priority sequence being detected to be insufficient, the stone in the second priority sequence is automatically used, and the building continues in the building sequence: the vertical wall numbered 5 on a rear vertical surface of the geometry, and a vertical wall numbered 6 on an upper vertical surface of the geometry. And when building a vertical wall numbered 7 on a front vertical surface of the geometry, in response to the stone in the second priority sequence being detected to be insufficient, any other material in the third priority sequence is automatically used. And since none of materials is set in the third priority sequence, the building is stopped after the vertical wall numbered 6 on the upper vertical surface of the geometry is built, and "Insufficient material, stop building" is rendered on the graphical user interface.

Through the above implementation manner, by setting the priority of multiple materials, when any material is insufficient, automatic replacement of materials is realized at the time of building, so that the user does not need to manually switch materials, and the smoothness of manipulation is enhanced.

Figure 5:
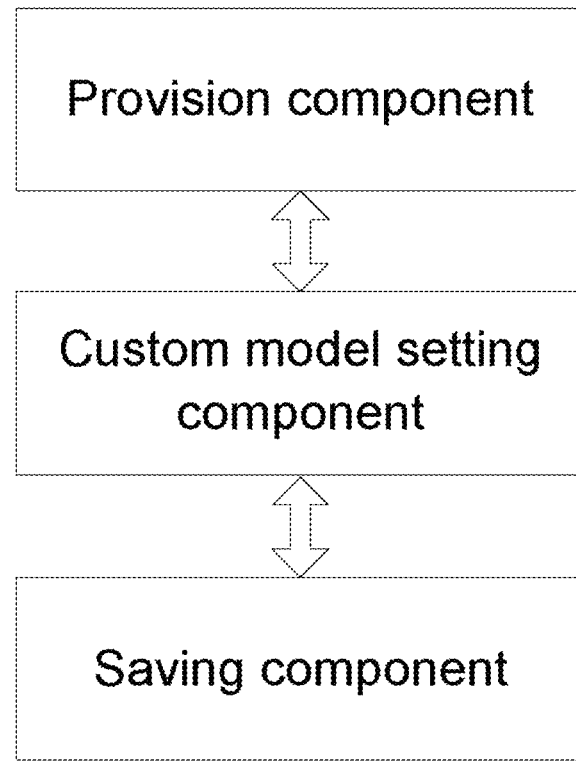
FIG. 5 is a structural block diagram of an information processing apparatus according to an embodiment of the present disclosure.

The present exemplary embodiment also discloses an information processing apparatus. The apparatus is applied to a mobile terminal having at least one processor for executing a software application and a touch screen which is rendered with a graphical user interface, contents rendered on the graphical user interface at least partially comprising a first game scene, the first game scene comprising at least one first virtual character. FIG. 5 is a composition diagram of an information processing apparatus according to an embodiment of the present disclosure. As shown in FIG. 5, the apparatus includes: a provision component, a custom model setting component and a saving component.

The provision component is configured to provide a custom model editing control on the graphical user interface.

The custom model setting component is configured to control, in response to a first touch operation acting on the custom model editing control, the first virtual character to build a custom model building in at least one first building area in the first game scene.

The saving component is configured to save, in response to a trigger event indicating the end of custom model editing, the custom model building as a custom model.

Specific details of various component elements in the above embodiment have been described in detail in the corresponding information processing method. In addition, it can be understood that the information processing apparatus further includes other element components corresponding to those in the information processing method. Therefore, detail descriptions are omitted herein.

It is to be noted that although several components or elements of the device for action execution are mentioned in the above detailed description, such division is not mandatory. In fact, according to the implementation manners of the present disclosure, the features and functions of two or more components or elements described above may be embodied in one component or element. Conversely, the features and functions of one component or element described above may be further divided into multiple components or elements and embodied.

Figure 6:
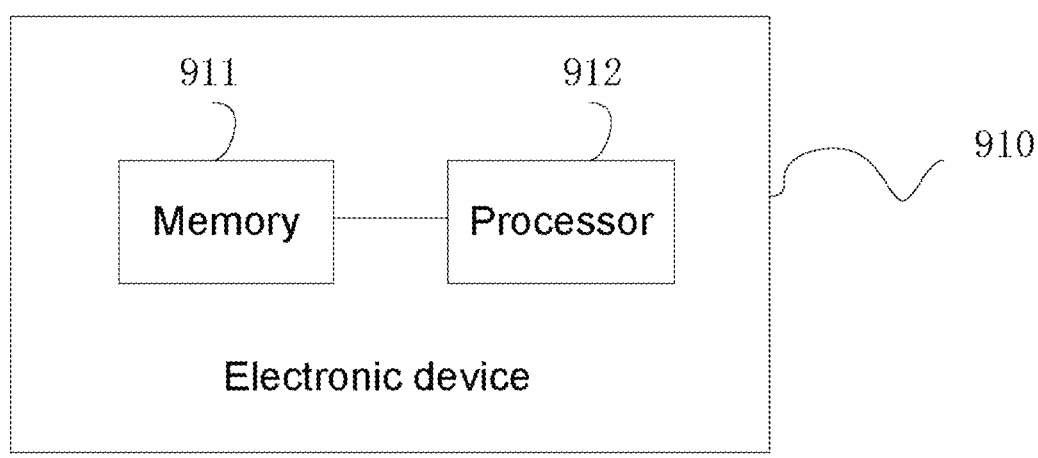
FIG. 6 is a structural schematic diagram of an electronic device according to an embodiment of the present disclosure.

FIG. 6 is a structural schematic diagram of an electronic device according to an embodiment of the present disclosure. As shown in FIG. 6, the electronic device 910 of the present embodiment includes: a memory 911 and a processor 912. The memory 911 may be connected with the processor 912 by a bus. A software application is executed on a processor of a terminal, and a touch screen of the terminal is rendered with a graphical user interface.

The processor 912 is provided.

The memory 911 is configured to store at least one executable instruction of the processor.

The processor is configured to execute the at least one executable instruction to perform the steps as follows.

A custom model editing control is provided on the graphical user interface.

In response to a first touch operation acting on the custom model editing control, controlling the first virtual character to build a custom model building in at least one first building area in the first game scene; and In response to a trigger event indicating the end of custom model editing, the custom model building is saved as a custom model.

Alternatively, the custom model building is formed by splicing at least one building component, and the step of controlling the first virtual character to build the custom model building in the at least one first building area in the first game scene includes the steps as follows.

First location information and first orientation information of the first virtual character in the first game scene are acquired.

The at least one first building area is determined according to the first location information and the first orientation information.

The at least one building component is built in the at least one first building area.

The at least one building component is numbered to obtain a number result according to a building sequence for building the at least one building component.

Alternatively, the step of saving the custom model building as the custom model includes the steps as follows.

It is determined whether a maximum number of the at least one building component is greater than or equal to 1.

When determining that the maximum number of the at least one building component is greater than or equal to 1, the custom model building is saved as the custom model, the building sequence of the at least one building component in the custom model is determined and recorded according to the number result.

When determining that the maximum number of the at least one building component is less than 1, a saving failure is prompted.

Alternatively, the step of saving, in response to the trigger event indicating the end of custom model editing, the custom model building as the custom model includes the steps as follows.

A saving control is provided on the graphical user interface.

In response to a second touch operation acting on the saving control, a building currently existing in the first game scene is determined as the custom model building.

The custom model building is saved as the custom model.

Alternatively, the step of saving the custom model building as the custom model includes the steps as follows.

Second location information and second orientation information of the first virtual character in the first game scene are acquired.

Third location information and third orientation information of the custom model building relative to the first virtual character are determined according to the second location information and the second orientation information.

The custom model building is saved as the custom model, and the third location information and the third orientation information are recorded.

Alternatively, the contents rendered on the graphical user interface at least further partially include a second game scene, and the method further includes the steps as follows.

A custom model building control corresponding to the custom model is provided on the graphical user interface.

In response to a third touch operation acting on the custom model building control, the custom model is acquired.

A custom model building corresponding to the custom model is built in the second game scene.

Alternatively, the step of building the custom model building corresponding to the custom model in the second game scene includes the steps as follows.

The third location information and the third orientation information are acquired, and fourth location information and fourth orientation information of the first virtual character in the second game scene are acquired.

At least one second building area is determined in the second game scene according to the third location information, the third orientation information, the fourth location information and the fourth orientation information.

The custom model building corresponding to the custom model is built in the at least one second building area according to the building sequence.

Alternatively, the method further includes the steps as follows.

A priority setting control is provided on the graphical user interface.

In response to a fourth touch operation acting on the priority setting control, a priority of at least one material used for building the custom model building is set according to the fourth touch operation, the at least one material including at least one of the following: wood, stone, and iron.

Alternatively, the step of building the custom model building corresponding to the custom model in the at least one second building area according to the building sequence includes the steps as follows.

A material with a first priority is determined according to the priority of the at least one material, and at least one building component corresponding to the custom model is sequentially built in the at least one second building area by using the material with the first priority according to the building sequence.

In response to the at least one material with the first priority being detected to be insufficient, it continues to build a building component corresponding to the custom model by using a material with a second priority according to the building sequence.

By means of one of the embodiments of the present disclosure, a building desired to be built in a game by a user is customized and packaged in advance, so that the user can quickly build a custom building in a game, thereby realizing the personalized customization of the user for the building, avoiding wasting too much time in repetitive component building in the game, effectively improving the user experience, reducing the manipulation complexity of the user during building through a mobile terminal, and enhancing the smoothness of game manipulation.

In an alternative implementation manner, the electronic device may further include at least one processor, and a memory resource represented by the memory and configured to store at least one instruction executable by a processing component, such as an application program. The application program stored in the memory may include one or more components each corresponding to a set of instructions. In addition, the processing component is configured to execute instructions to perform the above-described information processing method.

The electronic device may also include: a power supply component, configured to perform power management on the electronic device; a wired or wireless network interface, configured to connect the electronic device to a network; and an input output (I/O) interface. The electronic device may operate based on an operating system stored in the memory, such as Android, iOS, Windows, Mac OS X, Unix, Linux, FreeBSD, or the like.

Figure 7:
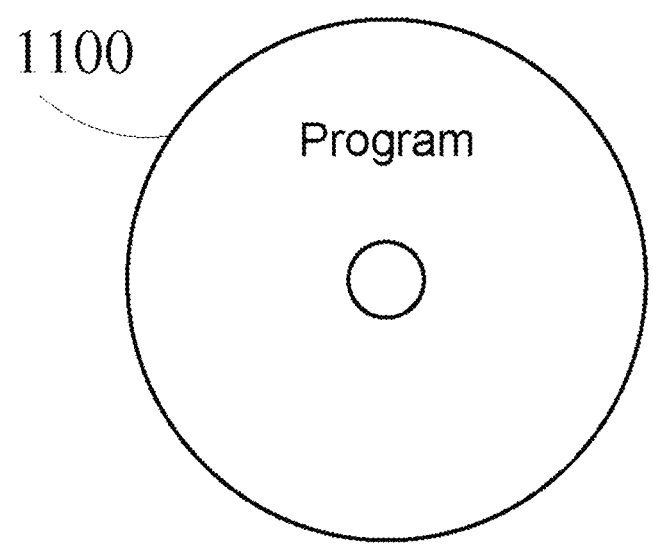
FIG. 7 is a structural schematic diagram of a storage medium according to an embodiment of the present disclosure.

FIG. 7 is a structural schematic diagram of a storage medium according to an embodiment of the present disclosure. As shown in FIG. 7, a program product 1100 according to an implementation manner of the present invention is described. A computer program is stored thereon. When being executed by a processor, the computer program performs the steps as follows.

A custom model editing control is provided on the graphical user interface.

In response to a first touch operation acting on the custom model editing control, controlling the first virtual character to build a custom model building in at least one first building area in the first game scene; and In response to a trigger event indicating the end of custom model editing, the custom model building is saved as a custom model.

Alternatively, the custom model building is formed by splicing at least one building component, and the step of controlling the first virtual character to build the custom model building in the at least one first building area in the first game scene includes the steps as follows.

First location information and first orientation information of the first virtual character in the first game scene are acquired.

The at least one first building area is determined according to the first location information and the first orientation information.

The at least one building component is built in the at least one first building area.

The at least one building component is numbered to obtain a number result according to a building sequence for building the at least one building component.

Alternatively, the step of saving the custom model building as the custom model includes the steps as follows.

It is determined whether a maximum number of the at least one building component is greater than or equal to 1.

When determining that the maximum number of the at least one building component is greater than or equal to 1, the custom model building is saved as the custom model, the building sequence of the at least one building component in the custom model is determined and recorded according to the number result.

When determining that the maximum number of the at least one building component is less than 1, a saving failure is prompted.

Alternatively, the step of saving, in response to the trigger event indicating the end of custom model editing, the custom model building as the custom model includes the steps as follows.

A saving control is provided on the graphical user interface.

In response to a second touch operation acting on the saving control, a building currently existing in the first game scene is determined as the custom model building.

The custom model building is saved as the custom model.

Alternatively, the step of saving the custom model building as the custom model includes the steps as follows.

Second location information and second orientation information of the first virtual character in the first game scene are acquired.

Third location information and third orientation information of the custom model building relative to the first virtual character are determined according to the second location information and the second orientation information.

The custom model building is saved as the custom model, and the third location information and the third orientation information are recorded.

Alternatively, the contents rendered on the graphical user interface at least further partially include a second game scene, and the method further includes the steps as follows.

A custom model building control corresponding to the custom model is provided on the graphical user interface.

In response to a third touch operation acting on the custom model building control, the custom model is acquired.

A custom model building corresponding to the custom model is built in the second game scene.

Alternatively, the step of building the custom model building corresponding to the custom model in the second game scene includes the steps as follows.

The third location information and the third orientation information are acquired, and fourth location information and fourth orientation information of the first virtual character in the second game scene are acquired.

At least one second building area is determined in the second game scene according to the third location information, the third orientation information, the fourth location information and the fourth orientation information.

The custom model building corresponding to the custom model is built in the at least one second building area according to the building sequence.

Alternatively, the method further includes the steps as follows.

A priority setting control is provided on the graphical user interface.

In response to a fourth touch operation acting on the priority setting control, a priority of at least one material used for building the custom model building is set according to the fourth touch operation, the at least one material including at least one of the following: wood, stone, and iron.

Alternatively, the step of building the custom model building corresponding to the custom model in the at least one second building area according to the building sequence includes the steps as follows.

A material with a first priority is determined according to the priority of the at least one material, and at least one building component corresponding to the custom model is sequentially built in the at least one second building area by using the material with the first priority according to the building sequence.

In response to the at least one material with the first priority being detected to be insufficient, it continues to build a building component corresponding to the custom model by using a material with a second priority according to the building sequence.

By means of one of the embodiments of the present disclosure, a building desired to be built in a game by a user is customized and packaged in advance, so that the user can quickly build a custom building in a game, thereby realizing the personalized customization of the user for the building, avoiding wasting too much time in repetitive component building in the game, effectively improving the user experience, reducing the manipulation complexity of the user during building through a mobile terminal, and enhancing the smoothness of game manipulation.

In an exemplary embodiment of the present disclosure, the computer-readable storage medium may include a data signal that is propagated in a baseband or as part of a carrier, carrying readable program codes. Such propagated data signals may take a variety of forms including, but not limited to, electromagnetic signals, optical signals, or any suitable combination of the foregoing. The computer-readable storage medium may send, propagate, or transmit a program for use by or in connection with an instruction execution system, apparatus, or device.

Program codes included in the computer-readable storage medium may be transmitted by any suitable medium, including but not limited to wireless, wire, optical cable, radio frequency, etc., or any suitable combination of the foregoing.

Through the description of the above implementation manner, those skilled in the art will readily understand that the example implementation manners described herein may be implemented by software or by software in combination with necessary hardware. Therefore, the technical solution according to the embodiment of the present invention may be embodied in the form of a software product, which may be stored in a non-volatile storage medium (which may be a CD-ROM, a USB flash drive, a mobile hard disk, etc.) or on a network. A number of instructions are included to cause a computing device (which may be a personal computer, server, electronic device, or network device, etc.) to perform a method in accordance with an embodiment of the present invention.

Other embodiments of the present disclosure will be apparent to those skilled in the art after considering the specification and practicing the present disclosure herein. The present application is intended to cover any variations, uses, or adaptations of the present disclosure, which are in accordance with the general principles of the present disclosure and include common general knowledge or conventional technical means in the art that are not disclosed in the present disclosure. The specification and examples are to be regarded as illustrative, and the true scope and spirit of the present disclosure are pointed out by the claims.

It is to be understood that the present disclosure is not limited to the accurate structure that have been described and shown in the drawings, and may make various modifications and variations without departing the scope thereof. The scope of the present disclosure is limited by the appended claims.

What is claimed is:

1. An information processing method, applied to a mobile terminal having at least one processor for executing a software application and a touch screen which is rendered with a graphical user interface, contents rendered on the graphical user interface at least partially comprising a first game scene, the first game scene comprising at least one first virtual character, the method comprising:
providing a custom model editing control on the graphical user interface;
in response to a first touch operation acting on the custom model editing control, controlling the first virtual character to build a custom model building in at least one first building area in the first game scene; and
in response to a trigger event indicating the end of custom model editing, saving the custom model building as a custom model;
wherein the custom model building comprises at least one building component, and controlling the first virtual character to build the custom model building in the at least one first building area in the first game scene comprises: acquiring first location information and first orientation information of the first virtual character in the first game scene; determining the at least one first building area according to the first location information and the first orientation information; building the at least one building component in the at least one first building area; and numbering the at least one building component according to a building sequence for building the at least one building component to obtain a number result.

2. The method as claimed in claim 1, wherein saving the custom model building as the custom model comprises:
in response to determining that the maximum number of the at least one building component is greater than or equal to 1, saving the custom model building as the custom model, and determining and recording the building sequence of the at least one building component in the custom model according to the number result; and
in response to determining that the maximum number of the at least one building component is less than 1, prompting a saving failure.

3. The method as claimed in claim 1, wherein saving, in response to the trigger event indicating the end of custom model editing, the custom model building as the custom model comprises:
providing a saving control on the graphical user interface;
in response to a second touch operation acting on the saving control, determining a building currently existing in the first game scene as the custom model building; and
saving the custom model building as the custom model.

4. The method as claimed in claim 2, wherein saving the custom model building as the custom model comprises:
acquiring second location information and second orientation information of the first virtual character in the first game scene;
determining, according to the second location information and the second orientation information, third location information and third orientation information of the custom model building relative to the first virtual character; and
saving the custom model building as the custom model, and recording the third location information and the third orientation information.

5. The method as claimed in 5, wherein the contents rendered on the graphical user interface at least further partially comprise a second game scene, and the method further comprises:
providing a custom model building control corresponding to the custom model on the graphical user interface;
in response to a third touch operation acting on the custom model building control, acquiring the custom model; and
building a custom model building corresponding to the custom model in the second game scene.

6. The method as claimed in claim 5, wherein building the custom model building corresponding to the custom model in the second game scene comprises:
acquiring the third location information and the third orientation information, and acquiring fourth location information and fourth orientation information of the first virtual character in the second game scene;
determining at least one second building area in the second game scene according to the third location information, the third orientation information, the fourth location information and the fourth orientation information; and
building the custom model building corresponding to the custom model in the at least one second building area according to the building sequence.

7. The method as claimed in claim 6, further comprising:
providing a priority setting control on the graphical user interface; and
in response to a fourth touch operation acting on the priority setting control, setting a priority of at least one material used for building the custom model building according to the fourth touch operation, wherein the at least one material comprises at least one of the following: wood, stone, and iron.

8. The method as claimed in claim 7, wherein building the custom model building corresponding to the custom model in the at least one second building area according to the building sequence comprises:
   determining a material with a first priority according to the priority of the at least one material, and sequentially building at least one building component corresponding to the custom model in the at least one second building area by using the material with the first priority according to the building sequence; and
   in response to the at least one material with the first priority being detected to be insufficient, continuing to build at least one building component corresponding to the custom model by using a material with a second priority according to the building sequence.

9. An information processing apparatus, applied to a mobile terminal having at least one processor for executing a software application and a touch screen which is rendered with a graphical user interface, contents rendered on the graphical user interface at least partially comprising a first game scene, the first game scene comprising at least one first virtual character, the apparatus comprising:
   a provision component, configured to provide a custom model editing control on the graphical user interface;
   a custom model setting component, configured to control, in response to a first touch operation acting on the custom model editing control, the first virtual character to build a custom model building in at least one first building area in the first game scene; and
   a saving component, configured to save, in response to a trigger event indicating the end of custom model editing, the custom model building as a custom model;
   wherein the custom model building comprises at least one building component, and the custom model setting component is further configured to acquire first location information and first orientation information of the first virtual character in the first game scene; determine the at least one first building area according to the first location information and the first orientation information; build the at least one building component in the at least one first building area; and number the at least one building component according to a building sequence for building the at least one building component to obtain a number result.

10. An electronic device, comprising:
    at least one processor; and
    at least one memory, configured to store at least one executable instruction of the at least one processor,
    wherein the at least one processor is configured to execute the information processing method as claimed in claim 1 by executing the at least one executable instruction.

11. A non-transitory storage medium, on which a computer program is stored, wherein the computer program is executed by at least one processor to implement the information processing method as claimed in claim 1.

* * * * *